United States Patent [19]
Bender

[11] 3,785,733
[45] Jan. 15, 1974

[54] METHOD OF CALIBRATING A GRAPHIC ARTS CAMERA

[75] Inventor: Lee C. Bender, Stone Park, Ill.

[73] Assignee: Log Etronics, Inc., Springfield, Va.

[22] Filed: Jan. 29, 1973

[21] Appl. No.: 327,356

[52] U.S. Cl.................... 355/77, 355/44, 355/61, 356/124
[51] Int. Cl. ........................................ G03b 27/68
[58] Field of Search ................ 355/18, 77, 44, 55, 355/59, 61–63; 356/124

[56] References Cited
UNITED STATES PATENTS
| | | | |
|---|---|---|---|
| 2,420,023 | 5/1947 | Wekeman | 355/61 |
| 3,028,785 | 4/1962 | Leach | 355/61 X |
| 3,295,408 | 1/1967 | Rab | 355/44 |

*Primary Examiner*—Samuel S. Matthews
*Assistant Examiner*—Richard A. Wintercorn
*Attorney*—Elliott I. Pollock

[57] ABSTRACT

A graphic arts camera is calibrated by first determining the effective focal length of the lens employed therein, and by thereafter positioning the lens board and copy board at approximate positions corresponding to the lens conjugate of 1:1. A target, comprising a number of concentric circles the diameters of which are empirically determined to represent off-axis locations at which the effects of lateral chromatic aberration are minimal for lenses of various different effective focal lengths, is placed on the copy board, a precision ruler is superimposed on the target, and a matching precision ruler is mounted on the ground glass at the rear of the camera. The camera lens is set to wide open aperture, whereafter the copy board is adjusted, while viewing the overall target image, to focus the camera; the lens board is adjusted, using the precision rulers, to adjust the image size; and these adjustments are repeated alternatively until proper focus at a 1:1 magnification ratio is approximately achieved. The lens board is then further adjusted while observing the magnified image of a particular portion of the target, to achieve a precise focus based upon color fringing effects in that magnified image. When optimum focus at wide-open aperture and at the conjugate of 1:1 have been achieved, and checked at maximum enlargement and reduction, the pointers on the camera are set to match the scaling system or, in the case of a screw drive camera, the counters are set to the exact numbers listed in the calibration charts ordinarily associated with such cameras.

6 Claims, 2 Drawing Figures ced camera over a long period of usage. In addition, while techniques for "shooting" a lens were relatively accurate, they determined the average focal length for the lens only at a particular combination of enlargement and reduction and did not necesarily give true size and focus at the common lens conjugate of 1:1.

METHOD OF CALIBRATING A GRAPHIC ARTS CAMERA

BACKGROUND OF THE INVENTION

Graphic arts cameras typically comprise a ground glass structure defining a film plane; a movable copy board upon which material to be reproduced may be placed; and a movable lens board, upon which any of a number of different focal length lenses may be mounted, disposed between the film plane and copy board. The camera further includes controls which may be employed to accurately position the lens board and copy board relative to one another and relative to the film plane, in order to achieve a properly focused image of material to be copied, at any desired ratio of magnification or reduction. Standard known formulas, which employ as parameters the focal length of the lens being utilized and the ratio of magnification or reduction desired, are used to develop data tables which may later be employed by a user of the equipment to set the lens board and copy board positions in order to achieve a properly focused image at a desired magnification or reduction ratio.

In order to develop the data tables, and to assure that the camera controls were properly calibrated in accordance with those tables, it first became necessary to determine the effective focal length of the symmetrical lens which the user might employ; the proper settings for the copy board and lens board depend entirely upon that effective focal length. In point of fact, graphic arts camera manufacturers have long recognized that the focal length specified by lens manufacturers is nominal and not exact; and it was customary to "shoot" each lens to determine its effective focal length. This was a relatively time consuming operation, e.g., it might require as much as four to six hours in order to determine the precise focal length of a given lens, and represented an operation which might have to be repeated periodically due to physical changes which might occur in the camera over a long period of usage. In addition, while techniques for "shooting" a lens were relatively accurate, they determined the average focal length for the lens only at a particular combination of enlargement and reduction and did not necesarily give true size and focus at the common lens conjugate of 1:1.

The first step employed in the prior "shooting" method was to determine the maximum enlargement and maximum reduction that could be obtained on the camera with the copy board in a particular fixed position. For example, with the copy board set in a given place for both enlargement and reduction, it was possible to obtain magnification ratios of 20 percent and 500 percent, or of 33⅓ percent and 300 percent, or of 50 percent and 200 percent. The larger the spread between the enlargement and reduction, the more accurate the determination of focal length, i.e., if the lens in question was supposed to perform on the camera between magnification ratios of 600 percent and 10 percent, the copy board would be set at a position at which the 20 percent and 500 percent combination of reduction and magnification could be obtained, rather than, for example, at the 50 percent and 200 percent combination.

Once a given enlargement and reduction combination was selected, the person calibrating the camera then placed a focussing target on the copy board. Prior targets employed for this purpose had a variety of different, usually arbitrary, configurations, for use in "eyeballing" proper focus. One such prior target configuration included a plurality of concentric circles, ostensibly for use in focussing lenses of different focal lengths. The diameter of each circle in these prior targets was dimensioned, for example, at two-thirds of the diameter of the published diagonal coverage for lenses of particular focal length at a 1:1 reproduction ratio; these prior target circle diameters were recommended by the lens manufacturers, but were pooly suited to proper calibration of the camera, and have been revised in major respects in the target used in the present invention.

The prior target, whatever its configuration, was centered with respect to the optical center of the copyboard, and an accurate metal ruler (graduated in hundredths of an inch) was superimposed on the target and oriented horizontally to intersect the optical center. The operator then roughed-in the selected enlargement at the center of the ground glass in his camera by repositioning the lens board until the image of the target ruler appeared to be in focus and at approximately the desired size, and then taped a matching metal ruler to the inner side of the ground glass in a position parallel to the ruler on the copy board. Once this was done, the operator adjusted a magnifying loupe so that it was focused on the roughened or inner surface of the ground glass when viewing through the ground glass from the clear side thereof, and thereafter commenced to adjust the copy board and lens board to produce a sharply focused image of a designated circle of the focusing target on the ground glass of the camera, and at the desired enlargement or reduction.

When proper focus at the selected combination of enlargement and reduction ratios was achieved, in the operator's judgment, the counter settings of the lens board and copy board were noted. The effective focal length of the lens was then determined mathematically. For example, when the enlargement and reduction combination selected was 200 percent and 50 percent, the mathematical technique required that the operator first subtract the lens counter setting at 50 percent from the lens counter setting at 200 percent whereafter the remainder was divided by 1.5, the quotient being the focal length of the lens. If the combination of magnification and reduction selected was 500 percent and 20 percent, the remainder was divided by 4.8; and if the combination selected was 33⅓ percent and 300 percent, the remainder was divided by 2.67. The number thus computed was thereafter checked for accuracy by a further mathematical technique.

Once the effective focal length for a given lens was computed, that computed focal length was used by the camera manufacturer to prepare tapes or charts which provided information or data as to just where the copy board and lens board should be positioned by a user for that specific lens, to obtain a particular magnification or reduction ratio at a presumably accurate focus. The user of the equipment thereafter would refer to these tapes or charts in setting up his camera. In practice, however, it was found that, when the user resorted to the tapes or charts alone, there would be instances where the size and/or focus were not precise, and the user therefore was often required to make further minor readjustments in the lens board and/or copy board positions to correct the size and/or focus to his personal satisfaction. In short, the techniques employed in the past were not only time consuming, but often resulted in calibration data which was not precisely accurate.

The present invention, recognizing these problems of the prior art, is concerned with a method of calibrating a graphic arts camera which dispenses with the "shooting" technique discussed above, which is accordingly far more rapid, and which can be used to calibrate a graphic arts camera to such exactitude that a user can rely with certainty upon the calibration tables and tapes or counters associated with that camera and can thereby dispense with the minor readjustments in copy board and/or lens board positions which had been customary heretofore.

SUMMARY OF THE INVENTION

The present invention differs from the prior "shooting" technique described above, in a number of respects. First, the effective focal length for a lens is determined by the application of data supplied by the lens manufacturer, as will be discussed hereinafter, to eliminate the type of mathematical computation of exact focal length used theretofore. In addition, proper size and focus are determined at the 1:1 lens conjugate, and at wide-open aperture, neither of which conditions was characteristic of prior calibration techniques. The calibration of the equipment at the 1:1 conjugate and wide-open lens aperture represents a most critical condition, and the most difficult image size and lens aperture setting which can be used, since the depth of focus is least and is most sensitive to misadjustment under these conditions.

In addition, in order to achieve precise focus, the method of the present invention makes use of a novel target having a number of concentric rings, for use respectively in focusing lenses of different effective focal lengths, which rings are placed at target locations quite different from those employed in prior targets. More particularly, the target, and technique, of the present invention are intended for use with apochromatic lenses, the type of lens most commonly employed in graphic arts cameras at the present time; and the diameter of a given off-axis target ring, determined empirically for use in focusing a lens of given nominal focal length and optical design, represents the off-axis location corresponding to the center of the visible spectrum of image coloration resulting from residual lateral chromatic aberration at the 1:1 conjugate for any lens of that optical design and corresponding effective focal length.

The camera is calibrated by first determining the effective focal length of the lens employed therein, using manufacturer-supplied data; thereafter positioning the lens board and copy board at approximate positions corresponding to the 1:1 lens conjugate; placing the aforementioned target on the copy board, centered on the optical axis of the camera; superimposing a precision ruler on the target; mounting a matching precision ruler on the ground glass at the rear of the camera; and setting the camera lens to wide open aperture. The copy board is then adjusted in position, while viewing the overall target image, to focus the camera; the lens board is adjusted in position, using the precision rulers, to adjust image size, and these positional adjustments are repeated successively and alternatively until, in the operator's judgment, good overall focus at a 1:1 magnification ratio has been achieved. The operator then further adjusts (if necessary) the lens board position, while observing the magnified image of a particular target ring, to achieve a precise focus determined by observable color fringing effects in the high contrast, magnified image of that target ring. When such precise focus has been achieved, and thereafter checked at maximum enlargement and reduction ratios, the pointers on the camera are set to match the scaling system or, in the case of a screw drive camera, the counters are set to the exact numbers listed in the associated calibration charts.

DESCRIPTION OF THE PREFERRED EMBODIMENTS

In the subsequent description, certain lens data will be given relating to nominal focal length, corrected focal length, target ring diameters, etc. This data is applicable to Nikkor Apochromatic Symmetric Process lenses marketed by Nikon, i.e., Nippon Kogaku K. K., a Japanese company. The data, and target ring dimensions, must be modified when apochromatic lenses, obtained from a different source, are to be employed; and techniques will be discussed hereinafter to permit the derivation, for example, of possible target ring dimensions for use in focusing such other lenses.

Figure 1:
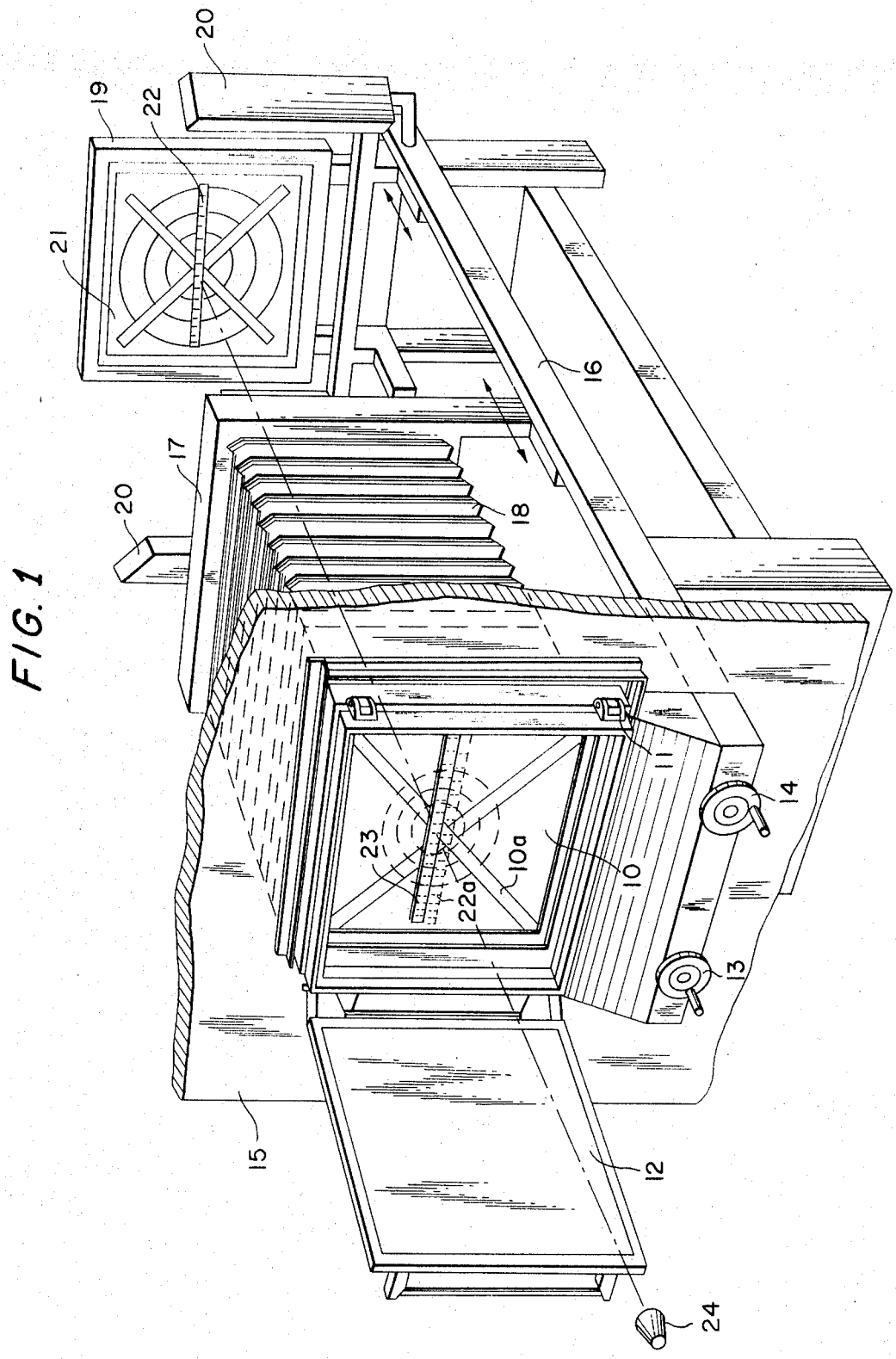
FIG. 1 is a perspective view of a graphic arts camera set up for calibration in accordance with the method of the present invention.

Lenses of the above type are conventionally employed in graphic arts cameras taking the form (subject to many variations known to those skilled in the art) generally shown in FIG. 1. The camera may, more particularly, comprise a ground glass surface 10 provided with a clear (unground) X-configuration 10a for use in viewing images of material placed on copy board 19. Glass surface 10 simulates the film plane in the camera, and is pivotally mounted at 11 to permit its replacement by photosensitive material, e.g. carried by a pivotally mounted door 12. These particular portions of the camera are normally located, along with manually operable controls 13 and 14 used for purposes of positioning the lens board 17 and copy board 19 (to be described) within a darkroom of light tight area represented by the wall 15; and the remainder of the graphic arts camera projects forwardly of said wall 15.

The camera further includes guideways such as 16 upon which a lens board 17, associated with a bellows 18, may be mounted for movement under the control of an operator; and a copy board 19 is also mounted on said guideways, forwardly of the lens board 17, for similar movement under operator control. The copy board 19 is normally associated with appropriate lamps such as 20 for reflectively illuminating the copy board.

The lens board 17 (upon which any of various different focal length lenses may be mounted) and the copy board 19 are adapted to be precisely positioned by controls 13 and 14 in order to achieve proper focus at a desired magnification (reduction or enlargement) ratio. More particularly, the boards 17 and 19 may be adjustably positioned by precision screw drives which are associated with counters disposed adjacent the controls 13 and 14; and the controls 13 and 14 can be manipulated until specified counts are achieved (in accordance with pre-prepared calibration tables) to ostensibly achieve proper positioning of the lens board 17 and copy board 19 for a desired application. Alternatively, the controls 13 and 14 can be provided with or associated with pointers which are, in turn, adapted to cooperate with an appropriate scaling system, such as precision graduated tapes coupled respectively to the lens board 17 and copy board 19 and movable therewith past said pointers as the controls 13 and 14 are manipulated. These arrangements (not shown in the drawings) and other arrangements known to those skilled in the art for these purposes, will be termed hereinafter "the camera scaling system."

The actual position which the lens board 17 and copy board 19 should take relative to one another, and relative to the film plane defined by the forward or roughened surface of ground glass 10, to achieve a properly focused image of specified enlargement or reduction size, can be computed by standard formulas; and such formulas are customarily used to generate data tables which are thereafter used by the camera operator to achieve a desired setup of the camera. Before the operator can truly rely upon the tables, however, the camera must be "calibrated" i.e., the camera scaling system must be so set that an operator, by manipulating controls 13 and 14 until a particular count or scale position is achieved, will thereby correctly locate the copy board 19 and lens board 17 at the precise positions relative to one another and relative to the film plane necessary to achieve the desired results. The present invention, as discussed earlier, is intended to permit a camera manufacturer or user to achieve such calibration with far greater precision and accuracy than has been the case heretofore.

The first step in the calibration method of the present invention is to determine the effective focal length of the lens which is mounted on lens board 17. This step of the method is effected by use of data supplied by the lens manufacturer (in this case Nikon). Every lens supplied by the manufacturer is accompanied by a lens data card which lists many characteristics of that particular lens; but the only data which need be considered at this point is the nominal focal length. The nominal focal length, listed in inches, minus a so-called Delta f1 factor in inches, will provide the effective focal length of that lens. The Delta f1 factor for a representative group of apo-chromatic Nikkor Symmetric lenses is as follows:

| Nominal Focal Length in inches | minus | Delta f1 Factor in inches | equals | Effective Focal Length |
|---|---|---|---|---|
| 9.50 | – | 0.007874 | = | 9.492126 |
| 12.00 | – | 0.009732 | = | 11.992126 |
| 14.00 | – | 0.011811 | = | 13.988189 |
| 19.00 | – | 0.015748 | = | 18.984252 |
| 24.00 | – | 0.019685 | = | 23.980315 |
| 30.00 | – | 0.023622 | = | 29.976378 |
| 35.00 | – | 0.027559 | = | 34.972441 |
| 47.50 | – | 0.035433 | = | 47.464567 |
| 71.25 | – | 0.047244 | = | 71.077756 |

Regardless of the enlargement and reduction application of the lens in question, the Delta f1 factor will compensate for the entire range of focus change, provided that the lens was properly sized and focused at the 1:1 conjugate.

After the effective focal length of the lens has been determined by use of the above data, charts and tapes are made up and used. When the camera scaling system using focusing tapes, these are installed in the process camera. The camera is squared to obtain planar parallel relationships between the film, lens board, and copy board, to within ±0.002 inches, and the ground glass is squared and its front surface set to +0.005 inches from the film supporting surface to allow for film thickness.

The lens is then mounted on the lens board 17, and the lens board is set to approximately two times the effective focal length (previously determined) from the film plane (for example, if we assume that the effective focal length is 24 inches, the lens would be positioned 48 inches from the film plane). The copy board is in turn set to approximately four times the lens focal length from the film plane (for example, using the 24 inch focal length lens assumed above, the copy board would be set 96 inches from the film plane). By these initial settings, the lens board and copy board are set close to the 1:1 conjugate, i.e., any material placed on copy board 19 will be imaged on the front surface of ground glass 10 at approximately the same size.

A high-contrast (e.g., black lines on white background) target 21 (shown in detail but at reduced scale in FIG. 2), is then placed on copy board 19. Target 21 comprises a plurality of concentric rings A, B, C, etc., having different diameters, and each ring bears a designation thereon identifying a nominal lens focal length associated therewith, e.g., ring A is identified by the numeral 12 and is to be used, as will be described hereinafter, for precision focusing a lens having a nominal focal length of 12 inches. Similarly, ring B is used in conjunction with a 14-inch focal length lens; ring C is used with a 19-inch focal length lens, etc. The target 21 further includes a checkerboard pattern D of X-configuration which is centered on the various target rings. The checkerboard pattern simulates a half-tone representation, is shaped to coincide with the clear glass portion 10a of the camera ground glass 10, and (while optional) facilitates the making of rough focusing adjustments.

The target 21 also includes a plurality of NBS standard resolution targets E which are not used during the calibration procedure of the present invention, but which may be employed to facilitate initial setup of the camera geometry. For example, during the initial setup, desired alignment and parallism between the lens board, copy board, and film planes can be visually checked by viewing the resolution targets in the four corners of the target 21, and by adjusting the planar orientations of the various planes specified until the same degree of resolution is obtained at all four corners of the image of target 21. The NBS resolution targets can be omitted, however, and indeed the checkerboard pattern D can also be omitted, since they have no direct relationship to the precision focusing technique accomplished through the use of the rings A, B, C, etc.

The diameter of each target ring A, B, C, etc. is determined empirically by a technique which will be described hereinafter, and represents the off-axis locus of points at which the effects of lateral chromatic aberration are minimum for the lens designated by that ring. The radius of each ring will be dependent upon the lens characteristics and will, accordingly, be different for lenses manufactured by different companies. The following chart of given nominal lens sizes, and target ring radii, is applicable to the aforementioned Nikkor lenses:

| Nominal Lens Focal Length (inches) | Target Ring Radius From Optical Center (inches) |
|---|---|
| 12 | 1.5 |
| 14 | 2.0 |
| 19 | 3.0 |
| 24 | 3.5 |
| 30 | 5.0 |
| 35 | 6.5 |
| 40 and above | 8.5 |

After the lens board and copy board of the camera have been set to the 1:1 conjugate position as described previously, and target 21 has been placed on the copy board and centered with respect to the optical center of the lens, a precision ruler 22, graduated in increments of 0.010 inches (e.g., a ruler of the type manufactured by L.S. Starrett Company, Athol, Mass.), is placed upon the target 22 and attached thereto adjacent the optical center of the target in accurate horizontal orientation. A matching precision ruler 23 is then mounted and taped to the inner or roughened side of the ground glass 10 in a position such that it is accurately aligned with the image 22a of the precision ruler 22. Each of the rulers 22 and 23 can be, for example, 24-inch rulers. The lens on lens board 17 is now set to wide open aperture, and reflective lighting, e.g., using lamps 20, is provided to achieve a maximum contrast between the black and white areas of the high-contrast target 21. The lighting is set by moving the lights 20 until a uniformly illuminated high contrast image appears on the ground glass 10.

The foregoing steps of the procedure, which could be termed the initial setup steps, are now followed by a further series of steps which are termed the rough sizing and focusing steps. More particularly, the overall target image is now viewed on ground glass 10 and, if the image appears to be out of focus, the image is brought into rough focus by moving copy board 19 toward or away from the film plane defined by ground glass 10. The checkerboard portion D of the target, as viewed in the clear glass portion 10a of ground glass 10, is particularly useful in achieving this rough focus.

When the rough focus has been achieved, in the judgment of the operator, rough size must again be set, i.e., the target image must have the same size as the target itself. In order to set rough size, the center graduation mark (e.g., the 12-inch mark) of ruler 23 is accurately aligned with the like mark in the projected image 22a of target-mounted ruler 22 and, after the marks have been so centered, the lens board 17 is moved toward or away from copy board 19 until the extreme right and left edge ruler marks (e.g., the 1-inch and 23-inch graduations) in ruler 23 and image 22a are also accurately aligned with one another. When the 1:1 magnification ratio has thus been achieved, the image will probably be slightly out of focus; and the focus is accordingly again set by the procedure previously described, i.e., by moving copy board 21. This focus readjustment may, in turn, require that the size be reset in accordance with the procedure discussed; and these alternate adjustments in the copy board and lens board position are continued until a proper size within ±0.0015 inches, at good focus of the overall target image, is achieved.

The operator then proceeds to a further series of steps to obtain precise focus and size. This series of steps requires that the operator concentrate on the particular one of the target rings A, B, C, etc., which corresponds to the nominal focal length of the lens then mounted on lens board 17. The image of that particular ring is viewed through the clear glass portion 10a of ground glass 10, under magnification, e.g., by supporting on the rear surface of ground glass 10 a 10× magnifier or loupe 24 which is focused on the roughened front surface (or image plane) of the ground glass 10. When the target ring image, thus viewed under magnification, is at exactly a 1:1 magnification ratio ±0.0015 inches, and in precise focus, the image will appear to have a fringe of brownish tint, rather than of red or green tint. Stated another way, precise focus is determined by noting certain color fringing effects which occur in the image of the particular target ring under observation, and precise focus corresponds to a condition wherein the color being observed is substantially at the center of the visible spectrum. If this brownish fringe tint is not observed, i.e., if the color of the target ring image fringe appears to be red or green, the lens board 17 and copy board 19 must be readjusted sequentially and alternatively, by the rough sizing and focusing steps previously described, until the desired precise focus is achieved at the 1:1 conjugate.

To further check the calibration of the lens, the lens board 17 and copy board 19 should now be set to relative positions corresponding to maximum enlargement and maximum reduction ratios, and the magnified target ring image should again be viewed on ground glass 10 for proper size and focus. If the focus is unsharp at maximum enlargement or maximum reduction, the operator must be go back to the 1:1 setting and repeat the entire procedure. Similarly, if the size varies by more than 0.0035 inches at maximum enlargement and maximum reduction, he should also go back to the 1:1 setting and repeat the entire procedure.

When precise focus at the 1:1 conjugate has been achieved, and checked in the foregoing manner, the camera scaling system is set and locked into proper position. More particularly, once exact focus has been obtained at the 1:1 magnification ratio, the operator consults the previously-prepared, mathematically computed, calibration tables associated with the camera to determine where, according to those tables, the lens board and copy board "should be" positioned; and the camera scaling system is then adjusted (e.g., the pointers, if used, or counters, if used, are set) to the precise readings specified in the calibration table, and then secured, e.g., pinned, at those precise settings.

Figure 2:
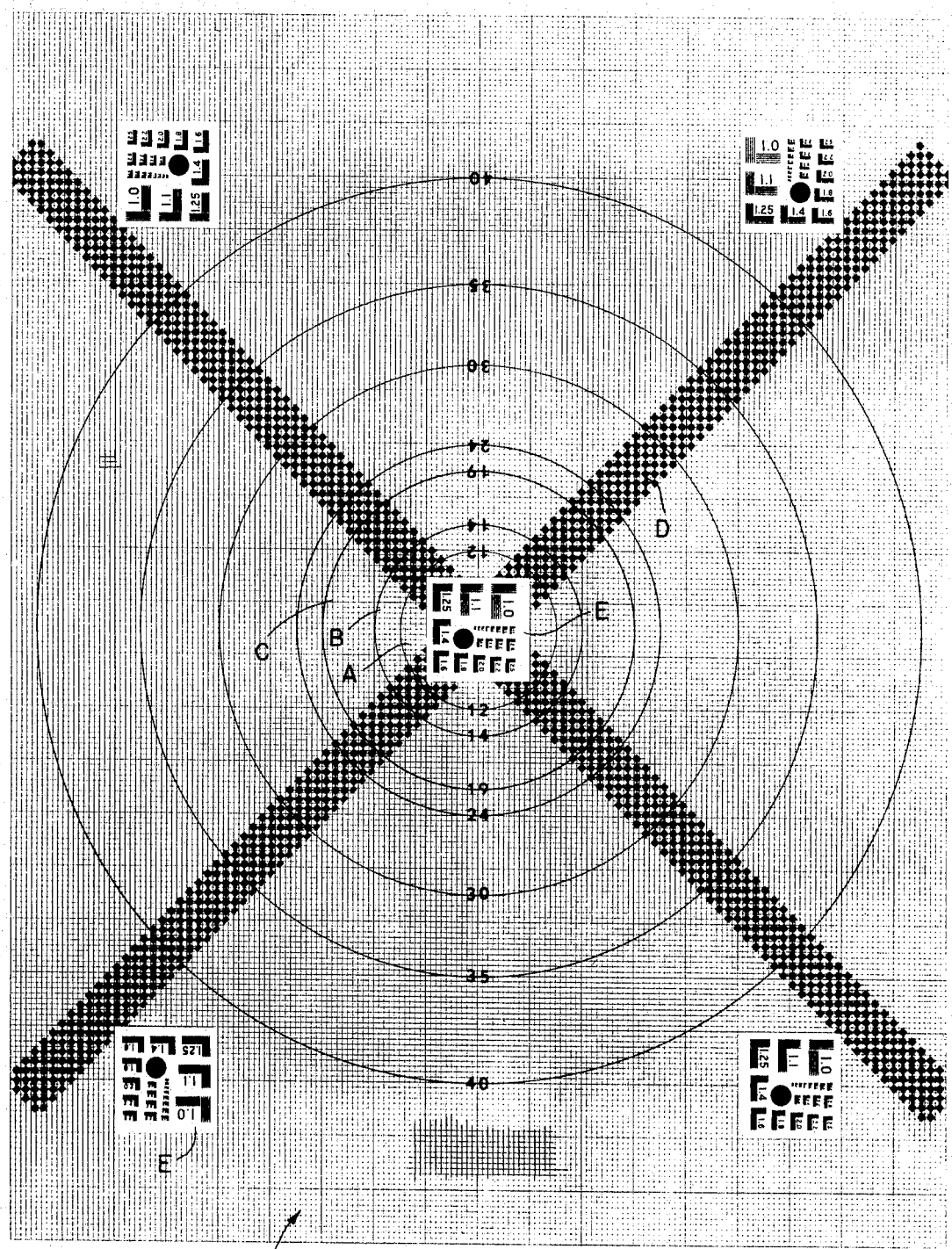
FIG. 2 depicts, at reduced size, a target which can be employed in practicing the calibration method of the present invention.

The target 21, and more particularly the radii of the various target rings therein, is developed empirically by a procedure entirely similar to that described above. A group of lenses (e.g., 30 lenses) of each nominal focal length is obtained from a manufacturing source for each of the focal lengths of interest (i.e., if six nominal focal lengths are under consideration, a total of something in the order of 180 lenses should be used). The Delta $f1$ factor for each nominal focal length is obtained from the lens manufacturer, and the effective focal length of the lenses in each group is calculated. Then, working with all of the lenses in a group of a particular nominal focal length, each such lens is mounted on the lens board, the lens is opened to its maximum aperture, a checkerboard pattern of the type represented at D in FIG. 2 is mounted on the copy board, precision rulers are mounted as previously described, and the lens board and copy board are adjusted in position relative to one another to obtain an accurately focused and sized image on the ground glass at a precise 1:1 magnification ratio.

When each lens is positioned at the 1:1 conjugate, a color spectrum will be observed in the image area appearing in the clear glass portion 10a of ground glass 10. The spectrum will progress from a red tint near the optical center of the image area to a green tint radially outward of that optical center. Points are then marked in each of the four quadrants (represented by the legs of the X-portion 10a) of the ground glass 10, with each marked point corresponding to the approximate midpoint of the visible spectrum (i.e., the "brownish"tint referred to earlier) observed in a given quadrant. The lens then mounted in the lens board 17 is replaced by a different lens of the same nominal focal length, the same procedure is followed, mid-spectrum points are marked in the four quadrants for this substituted lens, etc. After each of the e.g., 30 lenses in the group has been checked in this fashion, the spread of points in each quadrant, relative to the optical center is noted, an average point location is determined in each of the four quadrants, and a line is scribed through those selected average points to produce a target ring (such as A) for later use with lenses of that focal length and source. By an entirely similar empirical procedure, the target rings B, C, etc., can be located and scribed onto the target.

It must be noted that the location of the various target rings produced by the foregoing procedure is quite different from that of prior targets. For example, the diagonal coverage of a Nikkor apochromatic lens having a nominal focal length of 12 inches, at its maximum aperture ($f/9$) and at a 1 : 1 reproduction ratio, is 20¾ inches. In prior targets used for calibration purposes, it was assumed that the diameter of the target ring to be used in precise focusing of the lens should be two-thirds the diagonal coverage, i.e., for the parameters described, the target ring of the 12 inch focal length lens would be approximately 14 inches in diameter. In contrast, the diameter of the ring A is, as described previously, only 3 inches. Similarly, using lens data for a 19 inch focal length lens, prior techniques would have selected a target ring of approximately 21.5 inches in diameter, whereas the diameter of the ring C in the target employed in the present invention is only six inches. In short, the various ring diameters embodied in the target 21 are markedly different from those considered proper theretofore, are generated on a basis quite different from that selected heretofore, and, when used in the overall adjustment procedure described, permit the camera to be calibrated to far greater accuracy than was possible heretofore.

While I have thus described a preferred embodiment of the present invention, many variations will be suggested to those skilled in the art. It must therefore be understood that the foregoing description is intended to be illustrative only and not limitative of the present invention. All such variations and modifications as are in accord with the principles described are meant to fall within the scope of the appended claims.

Having thus described my invention, I claim:

1. A method of calibrating a graphic arts camera, of the type comprising a ground glass surface defining a film plane, a movable copy board, a movable lens board disposed between said ground glass surface and copy board, and controls including a camera scaling system for positioning said copy board and lens board relative to one another and relative to said film plane; said method comprising the steps of preparing a target which includes a first indicia representing an optical axis and a second high contrast indicia displaced from said first indicia and positioned at an off-axis location at which the effects of chromatic aberration for an apochromatic lens of particular effective focal length are minimum at a lens conjugate of 1:1; mounting an apochromatic lens of said effective focal length on the lens board, mounting said target on said copy board with the optical axes of said lens and target in alignment with one another and with the said copy board, lens board and ground glass surface in plane parallelism, setting said lens to its maximum aperture size, adjusting the positions of said lens board and copy board to the 1:1 lens conjugate, viewing color fringing effects in a magnified image of said second indicia on said ground glass while conducting said adjusting step until the observed color in said magnified image corresponds substantially to the center of the visible spectrum, and thereafter setting the camera scaling system.

2. The method of claim 1 wherein said step of preparing a target comprises locating a plurality of different second indicia differently displaced from said first indicia at a plurality of different off-axis locations at which the effects of chromatic aberration for a plurality of apochromatic lens of different effective focal lengths respectively is minimum, said viewing step comprising the step of viewing a magnified image of a particular one of said second indicia associated with the focal length of the lens then mounted on said lens board.

3. The method of claim 2 wherein said adjusting step comprises mounting a first precision ruler on said copy board to image both said first ruler and said target on said ground glass surface, mounting a second precision ruler on the roughened interior surface of said ground glass in parallel relation to the image of said first ruler, repositioning said copy board while viewing the second ruler and imaged first ruler on said ground glass surface to adjust image size, and repositioning said lens board while viewing said imaged target on said ground glass surface to adjust focus.

4. The method of claim 3 wherein said steps of repositioning said copy board and repositioning said lens board are conducted in alternative repeated sequence.

5. The method of claim 2 wherein said step of preparing said target comprises generating a plurality of different diameter circles, concentric with one another and with said first indicia, to produce said plurality of second indicia.

6. The method of claim 5 wherein said step of preparing said target further comprises the step of superimposing a high-contrast checkerboard pattern on said plurality of circles, said viewing step comprising initially viewing the image of said checkerboard pattern on said ground glass surface during said adjusting step and thereafter viewing the magnified image of a portion of a selected one of said concentric circles during a continuation of said adjusting step.

* * * * *